US010060668B2

United States Patent
Cole, Sr. et al.

(10) Patent No.: US 10,060,668 B2
(45) Date of Patent: *Aug. 28, 2018

(54) TEMPERATURE-CONTROLLED ENCLOSURES AND TEMPERATURE CONTROL SYSTEM USING THE SAME

(71) Applicant: Temptronic Corporation, Sharon, MA (US)

(72) Inventors: Kenneth M. Cole, Sr., Holliston, MA (US); Michael F. Conroy, Attleboro, MA (US); Edward Lowerre, Brooklyn, NY (US); James Pelrin, Taunton, MA (US)

(73) Assignee: Temptronic Corporation, Mansfield, MA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 13/854,678

(22) Filed: Apr. 1, 2013

(65) Prior Publication Data

US 2013/0231040 A1   Sep. 5, 2013

Related U.S. Application Data

(60) Continuation of application No. 12/612,028, filed on Nov. 4, 2009, now Pat. No. 8,408,020, which is a
(Continued)

(51) Int. Cl.
*F25D 23/00* (2006.01)
*F25D 23/06* (2006.01)
(Continued)

(52) U.S. Cl.
CPC ............. *F25D 23/061* (2013.01); *B01L 1/00* (2013.01); *G01M 99/002* (2013.01); *B01L 7/00* (2013.01);
(Continued)

(58) Field of Classification Search
CPC . F25D 23/061; B01L 1/00; B01L 7/00; B01L 2300/1838; B01L 2200/147; G01M 99/002; H02G 3/088; H02G 3/22
See application file for complete search history.

(56) References Cited

U.S. PATENT DOCUMENTS 2,692,298 A    4/1952   Dailey
3,422,300 A    1/1969   Knochel et al.
(Continued)

FOREIGN PATENT DOCUMENTS

CN    101443720    5/2009
EP     1996989    12/2008
(Continued)

OTHER PUBLICATIONS

English Translation of JP 7-18249, dated Mar. 31, 1995.*
(Continued)

*Primary Examiner* — Cassey D Bauer
(74) *Attorney, Agent, or Firm* — Burns & Levinson, LLP; Steven M. Mills

(57) ABSTRACT

A temperature chamber in which a device is tested is connected to a temperature-controlled air source for controlling temperature of the chamber. The temperature chamber includes thermal insulation formed on side surfaces of the chamber. A universal manifold adaptor for directing the temperature-controlled air directly to a device being tested is connected to the chamber. The temperature chamber also includes an exhaust system. A self-closing cable feed-through module is connected to an outer surface of the chamber. The feed-through module includes a first portion and a second portion, wherein cables are fed through the first and second portions into the chamber in a first position and the first and second portions form a leak tight seal around the cables in a second position.

55 Claims, 20 Drawing Sheets

Related U.S. Application Data division of application No. 11/717,432, filed on Mar. 13, 2007, now Pat. No. 7,629,533.

(60) Provisional application No. 60/784,044, filed on Mar. 20, 2006, provisional application No. 60/784,745, filed on Mar. 22, 2006.

(51) Int. Cl.
    *B01L 1/00*     (2006.01)
    *G01M 99/00*     (2011.01)
    *B01L 7/00*     (2006.01)

(52) U.S. Cl.
CPC . *B01L 2200/147* (2013.01); *B01L 2300/1838* (2013.01); *Y10T 16/063* (2015.01)

(56) References Cited

U.S. PATENT DOCUMENTS

| | | | |
|---|---|---|---|
| 4,860,602 | A | 8/1989 | Hines et al. |
| 4,993,724 | A * | 2/1991 | Hauff ................. F16L 5/08 277/606 |
| 5,205,969 | A | 4/1993 | Nett, Jr. et al. |
| 5,271,230 | A | 12/1993 | Spiess |
| 5,722,252 | A | 3/1998 | Kang et al. |
| 5,899,089 | A | 5/1999 | Kwon |
| 5,996,370 | A | 12/1999 | Lee |
| 6,098,473 | A | 8/2000 | Hafner |
| 6,189,484 | B1 | 2/2001 | Yin et al. |
| 6,315,209 | B1 | 11/2001 | Tripp |
| 6,564,566 | B2 | 5/2003 | Kim et al. |
| 6,908,512 | B2 | 6/2005 | Ivanov et al. |
| 7,304,251 | B1 | 12/2007 | Gretz |
| 7,411,128 | B2 | 8/2008 | Drotleff et al. |
| 7,507,907 | B2 | 3/2009 | Mueller et al. |
| 7,534,969 | B2 | 5/2009 | Menzel |
| 7,568,943 | B2 | 8/2009 | Harrison et al. |
| 2002/0134859 | A1 | 9/2002 | Gressett, Jr. et al. |
| 2004/0151629 | A1 | 8/2004 | Pease et al. |
| 2007/0240448 | A1 | 10/2007 | Cole, Sr. et al. |

FOREIGN PATENT DOCUMENTS

| | | |
|---|---|---|
| GB | 2314702 | 1/1998 |
| JP | 60253884 | 12/1985 |
| JP | 6383724 | 6/1988 |
| JP | 2101251 | 8/1990 |
| JP | 6082354 | 3/1994 |
| JP | 718249 | 3/1995 |
| JP | 2009530588 | 8/2009 |
| TW | 200805024 | 1/2008 |
| WO | 03012567 | 2/2003 |
| WO | 2007109027 | 9/2007 |

OTHER PUBLICATIONS

"Temperature-Controlled Enclosures and Temperature Control System Using the Same" Specification, Drawings, and Prosecution History of U.S. Appl. No. 11/717,432, filed Mar. 13, 2007, by Kenneth M. Cole, Sr., et al., which is stored in the U.S. Patent and Trademark Office (USPTO) Image File Wrapper (IFW) system.

"Temperature-Controlled Enclosures and Temperature Control System Using the Same" Specification, Drawings, and Prosecution History of U.S. Appl. No. 12/612,028, filed Nov. 4, 2009, by Kenneth M. Cole, Sr., et al., which is stored in the U.S. Patent and Trademark Office (USPTO) Image File Wrapper (IFW) system.

Office Action dated Dec. 20, 2011 and excerpt from letter from Japanese Associate of counterpart pending JP Application No. 2009-501454.

JP Office Action dated May 1, 2012 and English Translation of Office Action.

Excerpt from letter from Japanese Associate of counterpart pending JP Application No. 2009-501454.

International Search Report dated May 7, 2007 in International Application No. PCT/US2007/006344 filed Mar. 13, 2007.

File history of U.S. Pat. No. 7,629,533, dated Dec. 8, 2009.

File history of U.S. Pat. No. 8,408,020, dated Apr. 2, 2013.

\* cited by examiner

TEMPERATURE-CONTROLLED ENCLOSURES AND TEMPERATURE CONTROL SYSTEM USING THE SAME

RELATED APPLICATIONS

This application is a continuation of U.S. patent application Ser. No. 12/612,028, filed in the U.S. Patent and Trademark Office (USPTO) on Nov. 4, 2009, which is a divisional of U.S. patent application Ser. No. 11/717,432, filed in the USPTO on Mar. 13, 2007, now U.S. Pat. No. 7,629,533, which claims the benefit of U.S. Provisional Application No. 60/784,044, filed in the USPTO on Mar. 20, 2006, and U.S. Provisional Application No. 60/784,745, filed in the USPTO on Mar. 22, 2006, the contents of which applications are incorporated herein in their entirety by reference.

FIELD OF THE INVENTION

This invention relates generally to a temperature-controlled enclosure for connecting to a source of temperature-controlled fluid, such as air, and a system including the enclosure and the source. This invention relates in particular to a temperature-controlled chamber that includes thermal insulation, a means of directing air to a device being tested, an exhausting system and a self-closing cable feed-through module.

DESCRIPTION OF THE RELATED ART

There are many manufacturers of standard temperature chambers. In general, in such chambers, air is circulated in a closed loop with a fan or blower directing the air over a heating and/or cooling coil to condition the temperature of the air before it enters a test area. The air then exits the test area and is again directed over the heating and/or cooling coil to condition the temperature of the air before it reenters the test area. These steps are repeated. The standard temperature chambers simply circulate the air with no method for directing the air to the device being tested. In addition, the standard temperature chambers use a metal (or other material) liner inside the chamber. The metal liner acts as a thermal load and significantly increases the time to transition between set temperatures.

SUMMARY OF THE INVENTION

According to the invention, a source of temperature-controlled fluid is used as an open-loop temperature source for controlling the temperature within a temperature chamber. The source is either attached directly to the inlet of the temperature chamber or there is a flexible air transfer line, i.e., a flexible extender that connects a source head to the temperature chamber inlet. The temperature-controlled air exhausts out of the temperature chamber. By using the standard source as the temperature source, it is possible to connect the temperature-controlled air source (one at a time) to several different temperature chamber configurations, thus providing an economical solution when several different temperature chamber configurations are required. In addition, the source can be used as a temperature source for temperature testing various devices without attaching to a temperature chamber.

The present invention includes a family of temperature chambers for use with the source, i.e., the open-loop temperature source.

A feature of the present invention is to provide a temperature-controlled enclosure with a highly efficient thermal insulation design that provides overall improvement in thermal performance by minimizing heat loss and reducing thermal loads.

Another feature of the present invention is to provide a temperature-controlled enclosure with a highly efficient and field-changeable method of air distribution for improved thermal response for specific testing applications.

Another feature of the present invention is to provide a temperature-controlled enclosure with an air exhaust system for optimizing temperature uniformity.

Another feature of the present invention is to provide a temperature-controlled enclosure with a self-closing cable feed-through module.

One or more of the above features are included in each of the temperature chamber embodiments of the present invention.

Another feature of the present invention is to provide a temperature control system which incorporates one or more of the above features.

The present invention is directed to a temperature control system for controlling temperature of a device. The temperature control system includes a chamber in which the device can be located, a temperature-controlled source connected to the chamber for providing a temperature-controlled fluid to the chamber to control temperature in the chamber, and thermal insulation material formed on side surfaces of the chamber.

In one embodiment, the temperature control system further includes a universal manifold adaptor for directing the temperature-controlled fluid directly to the device.

In another embodiment, interchangeable manifolds are attachable to the universal manifold to direct the fluid to the device. In one embodiment, a manifold includes a single horizontal tube with multiple small holes for discharge of the fluid. In another embodiment, a manifold includes a plurality of horizontal tubes with multiple small holes for discharge of the fluid. In another embodiment, a manifold has a shower-head configuration to provide uniform distribution of the fluid. In another embodiment, a manifold includes a baffle system.

In one embodiment, the temperature control system further includes an exhaust system for exhausting the fluid from the chamber. In another embodiment, the exhaust system includes a plurality of exhaust ports connected internal to the chamber and a single outlet port for allowing the fluid to exit the chamber. In another embodiment, the exhaust system includes a plurality of exhaust ports connected internal to the chamber and multiple outlet ports for allowing the fluid to exit the chamber. In another embodiment, the exhaust system includes an exhaust port centrally located in the bottom of the chamber and an outlet port for allowing the fluid to exit the rear of the chamber. In another embodiment, a location of an exhaust is selectable by a user.

In one embodiment, the chamber has a hood configuration. In another embodiment, a thin layer of silicone is bonded to the surface of the thermal insulation material.

In one embodiment, the chamber has a clamshell configuration in which a top portion of the chamber is connected to a bottom portion of the chamber such that the top portion is opened in order to load the device being tested into the chamber. In another embodiment, the thermal insulation material is positioned between an outer shell of the chamber and an inner liner of the chamber.

In one embodiment, the chamber has a front-loader configuration in which a front portion of the chamber is connected to a rear portion of the chamber such that the front portion is opened in order to load the device into the chamber. In another embodiment, the thermal insulation material is positioned between an outer shell of the front-loader and an inner liner of the chamber.

In one embodiment, a self-closing cable feed-through module connected to an outer surface of the chamber. The module includes a first portion and a second portion, wherein cables are fed through the first and second portions into the chamber in a first position of the module and the first and second portions form a leak tight seal around the cables in a second position of the module.

In one embodiment, the fluid is air.

In accordance with another aspect of the invention, the invention is directed to a temperature chamber. The temperature chamber includes a chamber in which a device can be located. The chamber is connectable to a temperature-controlled source for providing a temperature-controlled fluid to the chamber to control temperature of the chamber. The temperature chamber further includes a universal manifold adaptor for directing the temperature-controlled fluid directly to the device.

In one embodiment, interchangeable manifolds are attachable to the universal manifold to direct fluid to the device. In one embodiment, a manifold includes a single horizontal tube with multiple small holes for discharge of the fluid. In another embodiment, a manifold includes a plurality of horizontal tubes with multiple small holes for discharge of the fluid. In another embodiment, a manifold has a shower-head configuration to provide uniform distribution of the fluid. In another embodiment, a manifold includes a baffle system.

In one embodiment, the temperature chamber further includes an exhaust system for exhausting the fluid from the chamber. In one embodiment, the exhaust system includes a plurality of exhaust ports connected internal to the chamber and a single outlet port for allowing the fluid to exit the chamber. In another embodiment, the exhaust system includes a plurality of exhaust ports connected internal to the chamber and multiple outlet ports for allowing the fluid to exit the chamber. In another embodiment, the exhaust system includes an exhaust port centrally located in the bottom of the chamber and an outlet port for allowing the fluid to exit the rear of the chamber. In another embodiment, a location of an exhaust is selectable by a user.

In one embodiment, the chamber has a hood configuration. In another embodiment, thermal insulation material is formed on side surfaces of the chamber, wherein a thin layer of silicone is bonded to the surface of the thermal insulation material.

In one embodiment, the chamber has a clamshell configuration in which a top portion of the chamber is connected to a bottom portion of the chamber such that the top portion is opened in order to load the device into the chamber. In another embodiment, thermal insulation material is formed on side surfaces of the chamber, wherein the thermal insulation material is positioned between an outer shell of the chamber and an inner liner of the chamber.

In one embodiment, the chamber has a front-loader configuration in which a front portion of the chamber is connected to a rear portion of the chamber such that the front portion is opened in order to load the device into the chamber. In another embodiment, thermal insulation material is formed on side surfaces of the chamber, wherein the thermal insulation material is positioned between an outer shell of the front-loader and an inner liner of the chamber.

In one embodiment, the temperature chamber further includes a self-closing cable feed-through module connected to an outer surface of the chamber. The module includes a first portion and a second portion, wherein cables are fed through the first and second portions into the chamber in a first position of the module and the first and second portions form a leak tight seal around the cables in a second position of the module.

In one embodiment, the fluid is air.

In accordance with another aspect of the invention, the invention is directed to a temperature chamber. The temperature chamber includes a chamber in which a device can be located. The chamber is connectable to a temperature-controlled source for providing a temperature-controlled fluid to the chamber to control temperature of the chamber. The temperature chamber further includes a self-closing cable feed-through module connected to an outer surface of the chamber. The module includes a first portion and a second portion, wherein cables are fed through the first and second portions into the chamber in a first position of the module and the first and second portions form a leak tight seal around the cables in a second position of the module.

In one embodiment, the temperature chamber further includes an exhaust system for exhausting the fluid from the chamber. In one embodiment, the exhaust system includes a plurality of exhaust ports connected internal to the chamber and a single outlet port for allowing the fluid to exit the chamber. In another embodiment, the exhaust system includes a plurality of exhaust ports connected internal to the chamber and multiple outlet ports for allowing the fluid to exit the chamber. In another embodiment, the exhaust system includes an exhaust port centrally located in the bottom of the chamber and an outlet port for allowing the fluid to exit the rear of the chamber. In another embodiment, a location of an exhaust is selectable by a user.

In one embodiment, the chamber has a hood configuration. In another embodiment, thermal insulation material is formed on side surfaces of the chamber, wherein a thin layer of silicone is bonded to the surface of the thermal insulation.

In one embodiment, the chamber has a clamshell configuration in which a top portion of the chamber is connected to a bottom portion of the chamber such that the top portion is opened in order to load the device into the chamber. In another embodiment, thermal insulation material is formed on side surfaces of the chamber, wherein the thermal insulation material is positioned between an outer shell of the clamshell and an inner liner of the chamber.

In one embodiment, the chamber has a front-loader configuration in which a front portion of the chamber is connected to a rear portion of the chamber such that the front portion is opened in order to load the device into the chamber. In another embodiment, thermal insulation material is formed on side surfaces of the chamber, wherein the thermal insulation material is positioned between an outer shell of the front-loader and an inner liner of the chamber.

In one embodiment, the fluid is air.

In one embodiment, the temperature chamber further includes a universal manifold adaptor for directing the temperature-controlled fluid directly to the device, wherein interchangeable manifolds are attachable to the universal manifold to direct the fluid to the device. In one embodiment, a manifold includes a single horizontal tube with multiple small holes for discharge of the fluid. In another embodiment, a manifold includes a plurality of horizontal tubes with multiple small holes for discharge of the fluid. In another embodiment, a manifold has a shower-head configuration to provide uniform distribution of the fluid. In another embodiment, a manifold includes a baffle system.

In accordance with another aspect of the invention, the invention is directed to a temperature chamber. The temperature chamber includes a chamber in which a device can be located. The chamber is connectable to a temperature-controlled source for providing a temperature-controlled fluid to the chamber to control temperature in the chamber. The temperature chamber further includes thermal insulation material formed on side surfaces of the chamber.

In one embodiment, the temperature chamber further includes a universal manifold adaptor for directing the temperature-controlled fluid directly to the device. In one embodiment, interchangeable manifolds are attachable to the universal manifold to direct the fluid to the device. In one embodiment, a manifold includes a single horizontal tube with multiple small holes for discharge of the fluid. In another embodiment, a manifold includes a plurality of horizontal tubes with multiple small holes for discharge of the fluid. In another embodiment, a manifold has a showerhead configuration to provide uniform distribution of the fluid. In another embodiment, a manifold includes a baffle system.

In one embodiment, the temperature chamber further includes an exhaust system for exhausting the fluid from the chamber. In one embodiment, the exhaust system includes a plurality of exhaust ports connected internal to the chamber and a single outlet port for allowing the fluid to exit the chamber. In another embodiment, the exhaust system includes a plurality of exhaust ports connected internal to the chamber and multiple outlet ports for allowing the fluid to exit the chamber. In another embodiment, the exhaust system includes an exhaust port centrally located in the bottom of the chamber and an outlet port for allowing the fluid to exit the rear of the chamber. In another embodiment, a location of an exhaust is selectable by a user.

In one embodiment, the chamber has a hood configuration. In another embodiment, a thin layer of silicone is bonded to the surface of the thermal insulation material.

In one embodiment, the chamber has a clamshell configuration in which a top portion of the chamber is connected to a bottom portion of the chamber such that the top portion is opened in order to load the device being tested into the chamber. In another embodiment, the thermal insulation material is positioned between an outer shell of the chamber and an inner liner of the chamber.

In one embodiment, the chamber has a front-loader configuration in which a front portion of the chamber is connected to a rear portion of the chamber such that the front portion is opened in order to load the device into the chamber. In another embodiment, the thermal insulation material is positioned between an outer shell of the front-loader and an inner liner of the chamber.

In one embodiment, the temperature chamber further includes a self-closing cable feed-through module connected to an outer surface of the chamber. The module includes a first portion and a second portion, wherein cables are fed through the first and second portions into the chamber in a first position of the module and the first and second portions form a leak tight seal around the cables in a second position of the module.

In one embodiment, the fluid is air.

In accordance with another aspect of the invention, the invention is directed to a temperature control system for controlling temperature of a device. The temperature control system includes a chamber in which the device can be located, a temperature-controlled source connected to the chamber for providing a temperature-controlled fluid to the chamber to control temperature in the chamber, and a universal manifold adaptor for directing the temperature-controlled fluid directly to the device.

In accordance with another aspect of the invention, the invention is directed to a temperature control system for controlling temperature of a device. The temperature control system includes a chamber in which the device can be located, a temperature-controlled source connected to the chamber for providing a temperature-controlled fluid to the chamber to control temperature in the chamber and a self-closing cable feed-through module connected to an outer surface of the chamber. The module includes a first portion and a second portion, wherein cables are fed through the first and second portions into the chamber in a first position of the module and the first and second portions form a leak tight seal around the cables in a second position of the module.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

According to the invention, a source of temperature-controlled fluid such as air, for example, ThermoStream™ model TP04300 or TP04310, manufactured and sold by Temptronic Corporation of Sharon, Mass., is used as an open-loop temperature source for controlling the temperature within a temperature chamber. The source is either attached directly to the inlet of the temperature chamber or there is a flexible air transfer line, i.e., a flexible extender that connects a source head to the temperature chamber inlet. The temperature-controlled air exhausts out of the temperature chamber. According to the invention, it is possible to connect the temperature-controlled air source (one at a time) to several different temperature chamber configurations, thus providing an economical solution when several different temperature chamber configurations are required. The device being tested in the temperature chamber could be a printed circuit board, mechanical or electronic module or any other device requiring thermal test. In addition, the source can be used as a temperature source for temperature testing various devices without attaching to a temperature chamber.

The present invention includes a family of interchangeable temperature chambers for use with the source, i.e., the open-loop temperature source. The features of the chambers include a highly efficient thermal insulation design that provides overall improvement in thermal performance by minimizing heat loss and reducing thermal loads, a highly efficient and field changeable method of air distribution for improved thermal response for specific testing applications, unique air exhaust systems for optimizing temperature uniformity, and a self-closing cable feed-through module.

Figure 1:
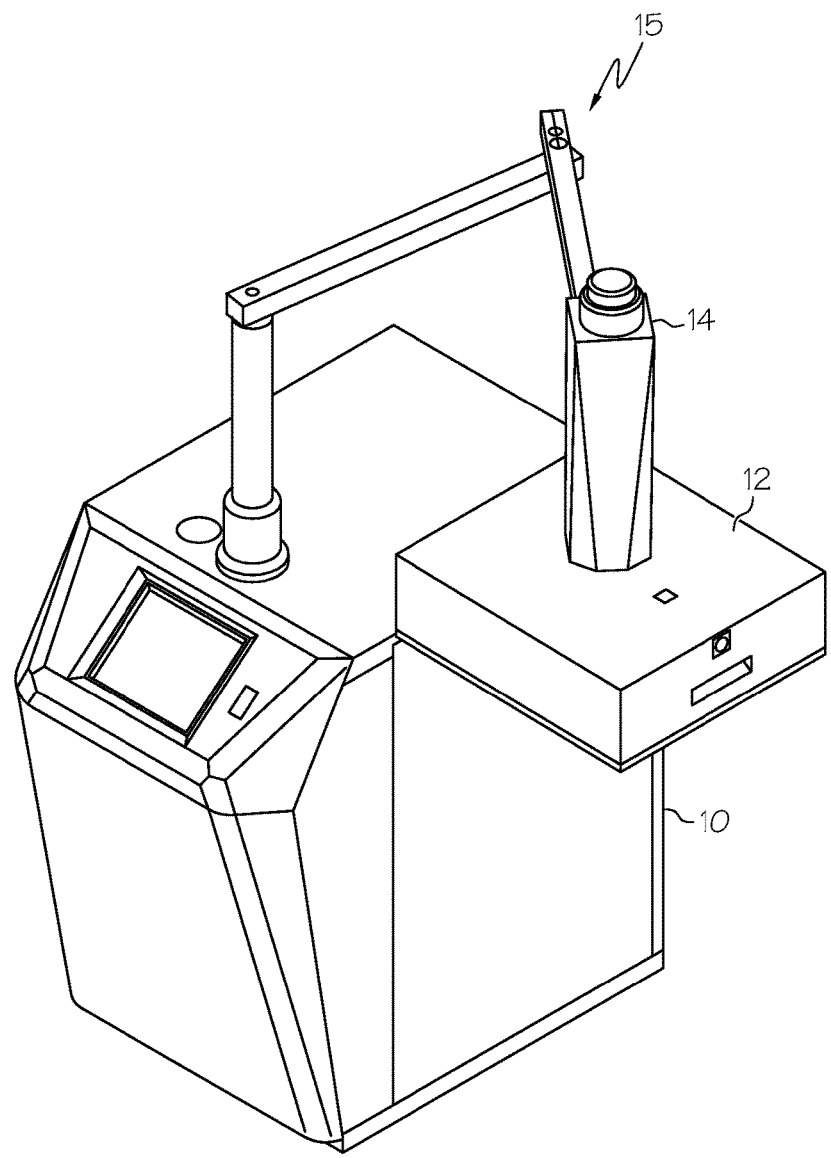
FIG. 1 is a schematic perspective view of a hood chamber connected to a temperature-controlled air source in accordance with an embodiment of the invention.

In a first embodiment of the present invention, the chamber is of a hood configuration. FIG. 1 is a schematic perspective view of a hood chamber 12 according to an embodiment of the invention connected to a source 10 of temperature-controlled fluid such as air. The source 10 can be, for example, a ThermoStream™ model TP04300 or TP04310, manufactured and sold by Temptronic Corporation of Sharon, Mass., or other similar device. The source 10 is used as the temperature-controlled air source for controlling the temperature within the hood chamber 12. A head 14 of the source 10 attaches directly to the top side of the hood chamber 12 with three knurled screws. No tools are required to attach the head 14 to the hood chamber 12. The head 14 is attached to the source 10 by a pivoting arm 15.

FIGS. 2A-2E are schematic views of the hood chamber 12 of FIG. 1 with a universal manifold adapter 20 in accordance with an embodiment of the invention. The hood chamber 12 is provided with the universal manifold adapter 20 designed to improve temperature response which reduces time for completion of a test and, therefore, reduces the test cost. The universal manifold adapter 20 allows interchangeable manifolds to be used to optimize temperature testing. FIGS. 2A-2E illustrate the interchangeable manifolds. To optimize thermal performance it is desirable that the temperature-controlled air being supplied by the source 10 be directed to the device being tested. Conventional thermal enclosures (chambers) simply circulate the air with no method for directing the air to the device being tested. With the universal manifold adapter 20 in the hood chamber 12, a manifold can be added to direct the temperature-controlled air directly to the device being tested.

Figure 2B:
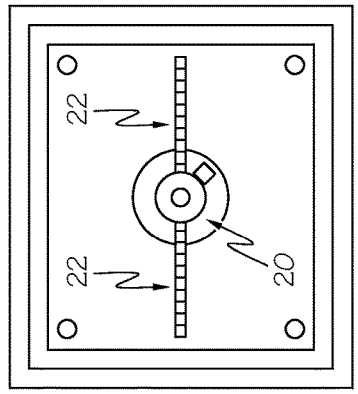
FIGS. 2A-2E are schematic views of the hood chamber of FIG. 1 with a universal manifold adapter in accordance with an embodiment of the invention.
Figure 2C:
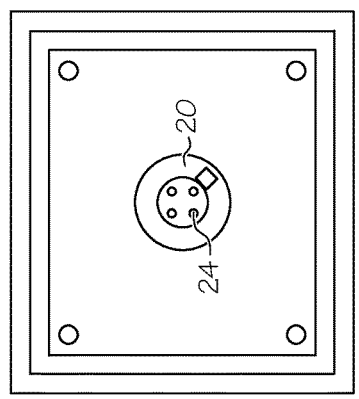
Figure 2A:
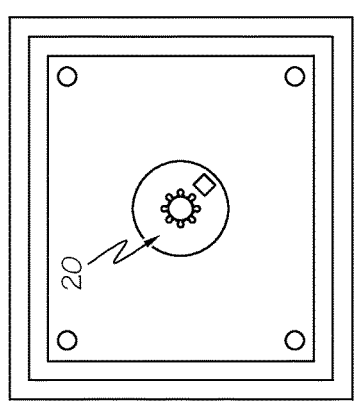
Figure 2E:
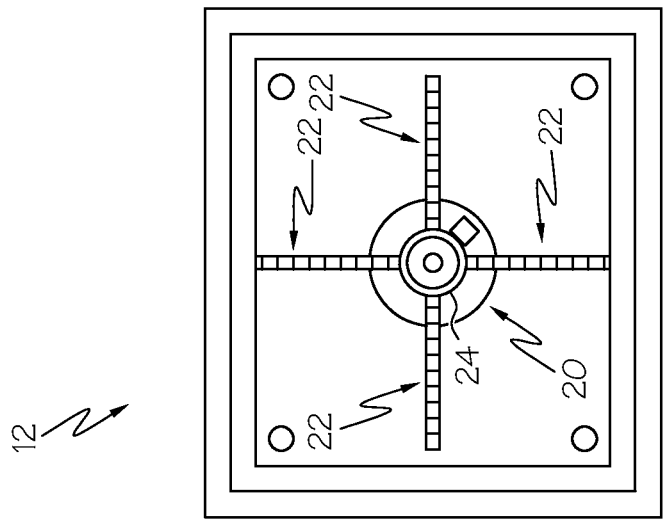
Figure 2D:
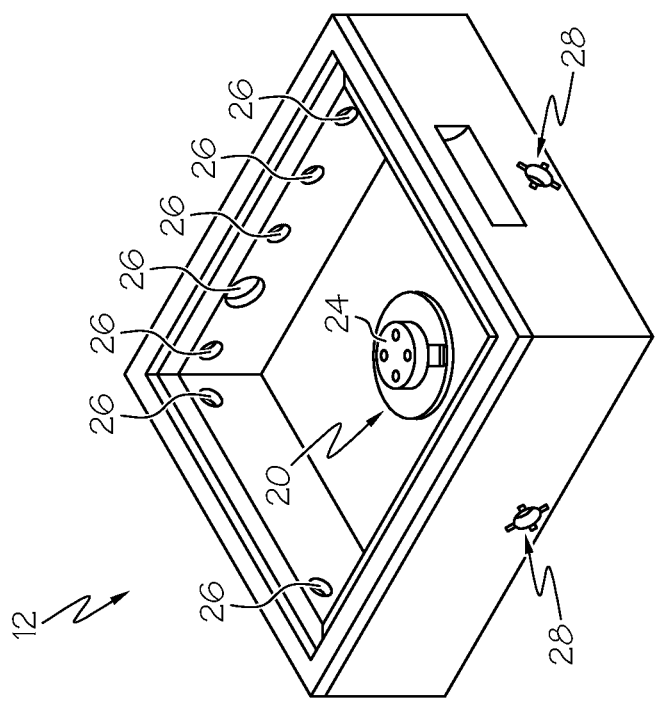

The universal manifold adapter 20 allows the air distribution manifold to be changed to a different configuration if necessary to accommodate changes in test requirements within the same hood chamber 12. FIG. 2A is a schematic view of the hood 12 with the universal manifold adaptor 20 with no manifolds attached thereto. The universal manifold adapter 20 has several attachment points (holes) that allow attachment of interchangeable manifolds. The manifold can be a single horizontal tube 22 with multiple small holes for air discharge. The manifold can be two or more horizontal tubes 22. FIG. 2B is a schematic view of the hood chamber 12 with two horizontal tubes 22 with multiple small holes for air discharge attached to the universal manifold adapter 20. The manifold can be a piece of flexible tube to better direct air on the device being tested. The manifold can be a shower head type to provide uniform distribution of temperature-controlled air, or any other manifold for distribution of temperature-controlled air. FIG. 2C is a schematic view of the hood chamber 12 with a shower-head type manifold 24 attached to the universal manifold adaptor 20. FIG. 2D is a schematic view of the hood chamber 12 with a shower-head type manifold 24 attached to the universal manifold adaptor 20 and exhaust ports 26 at side portions of the hood chamber 12. FIG. 2E is a schematic view of the hood chamber 12 with a shower-head manifold 24 and four horizontal tubes 22 with multiple small holes for air discharge attached to the universal manifold adaptor 20.

Figure 3:
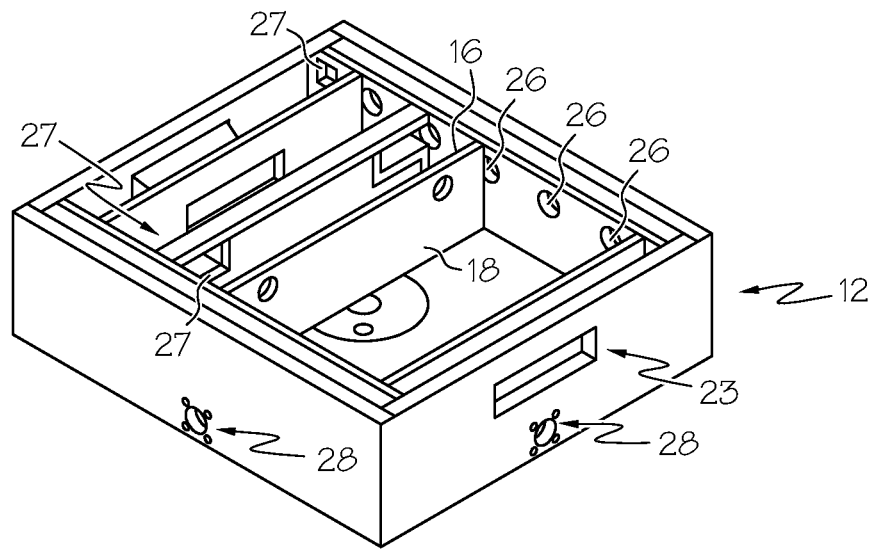
FIG. 3 is a schematic perspective view of the hood chamber of FIG. 1 in accordance with an embodiment of the invention.

FIG. 3 is a schematic perspective view of the hood chamber 12 of FIG. 1 in accordance with an embodiment of the invention. The thermal insulation design used for the hood chamber 12 as shown in FIG. 3 allows temperature changes to occur much faster than with existing approaches. The hood chamber 12 includes a layer of thermal insulation 16 with a thin layer of silicone 18 bonded to the surface of the insulation 16. The bonded layer 18 provides needed protection against damage to the insulation 16. The bonded layer 18 eliminates the need for a metal (or other material) liner inside the hood chamber 12, which would act as a thermal load and significantly increase the time to transition between set temperatures. The hood chamber 12 includes a handle 23.

Figure 4:
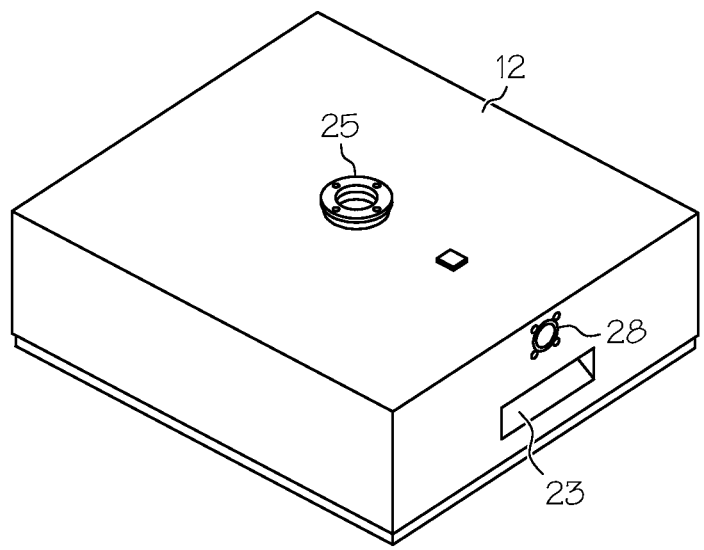
FIG. 4 is a schematic perspective view of the hood chamber of FIG. 1 in accordance with an embodiment of the invention.

FIG. 4 is a schematic perspective view of the hood chamber 12 of FIG. 1 in accordance with an embodiment of the invention. In FIG. 4, the hood chamber 12 is disconnected from the air source 10. An air-in connection 25 is used to connect to the source 10.

The hood chamber 12 also incorporates a unique air exhausting system to optimize temperature uniformity within the test area. All hood chamber configurations provide multiple exhaust areas within the test areas to ensure uniform air distribution throughout the test area. The exhaust areas are typically located in side portions of the hood chamber 12 but can be in other locations if necessary to optimize uniformity. As shown in FIG. 2D and FIG. 3, exhaust ports 26 are located at side portions of the hood chamber 12. As shown in FIG. 2D and FIG. 3, all of the exhaust ports 26 are connected internal to the hood chamber 12 with only one exit exhaust 28 exiting the hood chamber 12 being used in a selected configuration. Internal route 27 is the route of the exhaust in the hood chamber 12. The exhaust location is user selectable (first and second exit ports 28, which are 90 degrees apart) for test operator convenience. The hood chamber 12 includes a handle 23.

Figure 5A:
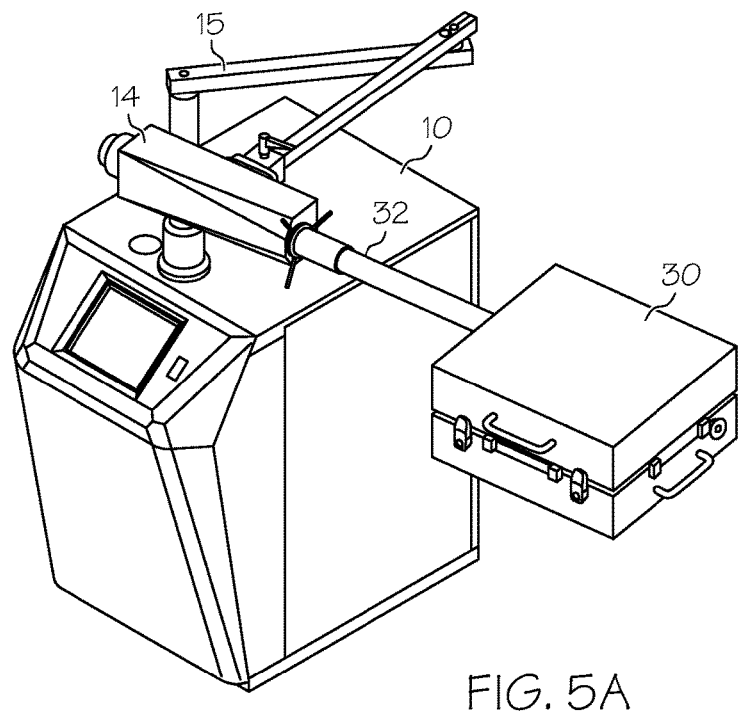
FIGS. 5A and 5B are schematic perspective views of a clamshell chamber connected to a temperature-controlled air source in accordance with an embodiment of the invention.
Figure 5B:
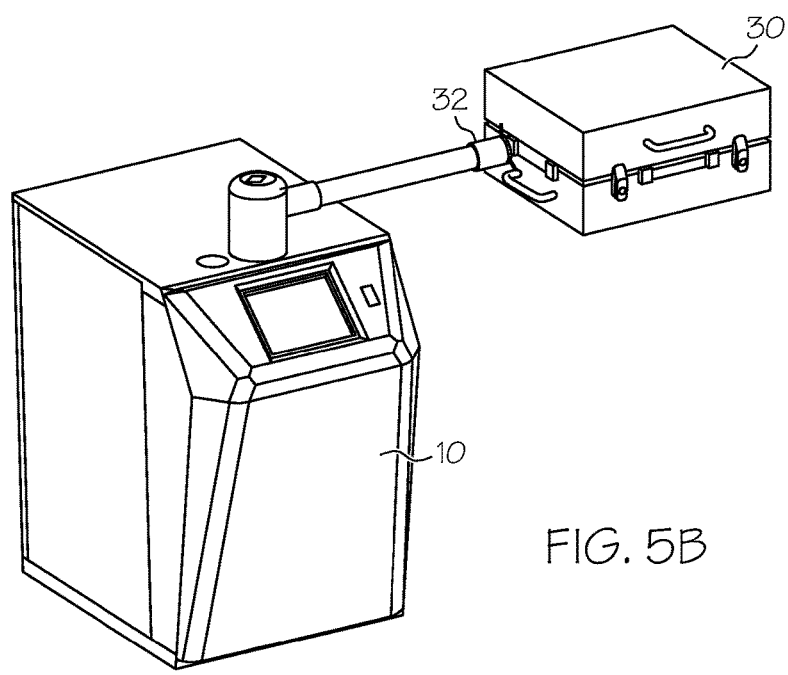

In an alternative embodiment, the chamber is of a clamshell configuration. FIGS. 5A and 5B are schematic perspective views of a clamshell chamber 30 connected to the source 10, in accordance with an embodiment of the invention. The clamshell chamber 30 is top-loaded such that the device being tested is loaded into the chamber from the top. In FIGS. 5A and 5B, a source 10 is used as the temperature-controlled air source for controlling the temperature within the clamshell chamber 30. In FIG. 5A, the head 14 of the source 10 attaches to the side of the clamshell chamber 30 via a flex extender 32 which transfers the temperature-controlled air from the source 10 to the clamshell chamber 30. In FIG. 5A, the head 14 is connected to a pivoting arm 15. In FIG. 5B, the output of the source 10 attaches to the side of the clamshell chamber 30 via the flex extender 32 which transfers the temperature-controlled air from the source 10 to the clamshell chamber 30. Attachment of the flex extender 32 to the clamshell chamber 30 is made with three knurled screws. No tools are required to attach the flex extender 32 to the clamshell chamber 30. The attachment can be made to either side of the clamshell chamber for convenience.

Figure 6A:
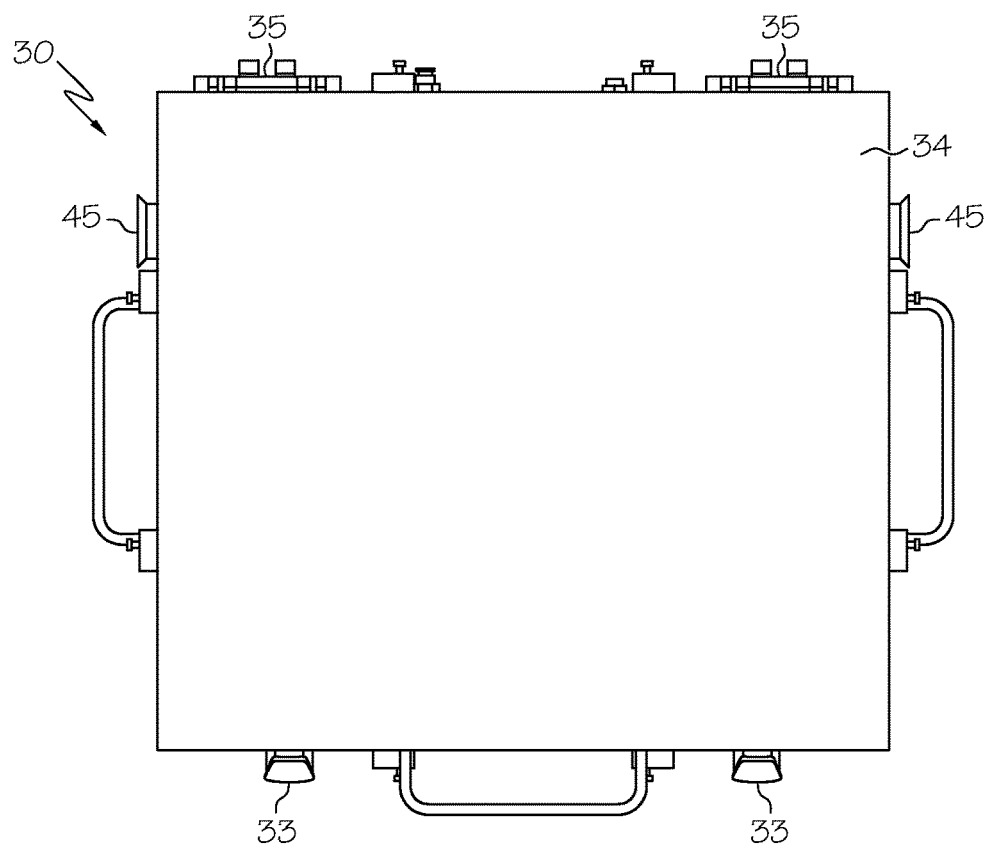
FIGS. 6A-6D are schematic views of the clamshell chamber of FIGS. 5A and 5B in accordance with an embodiment of the present invention.
Figure 6B:
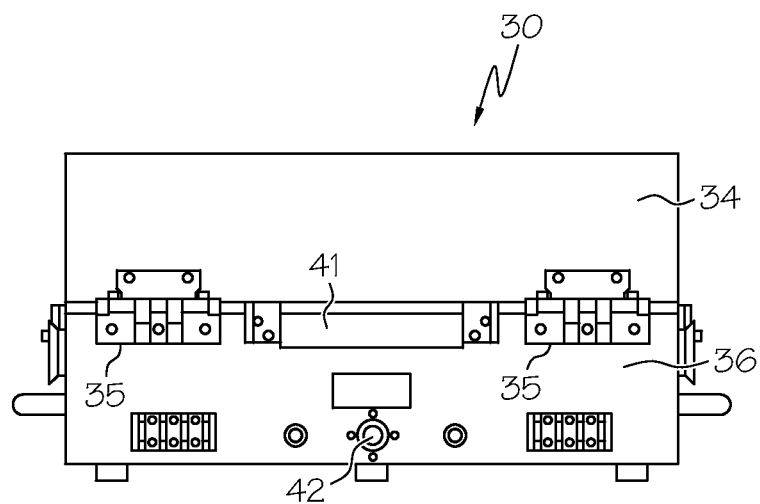
Figure 6C:
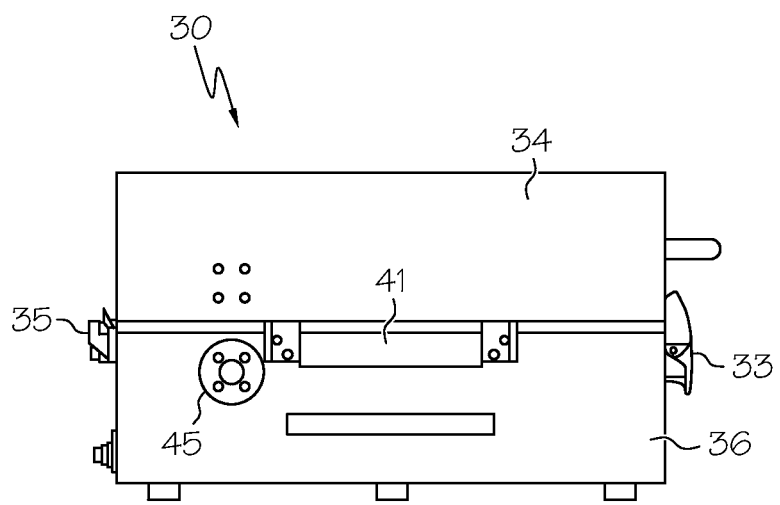
Figure 6D:
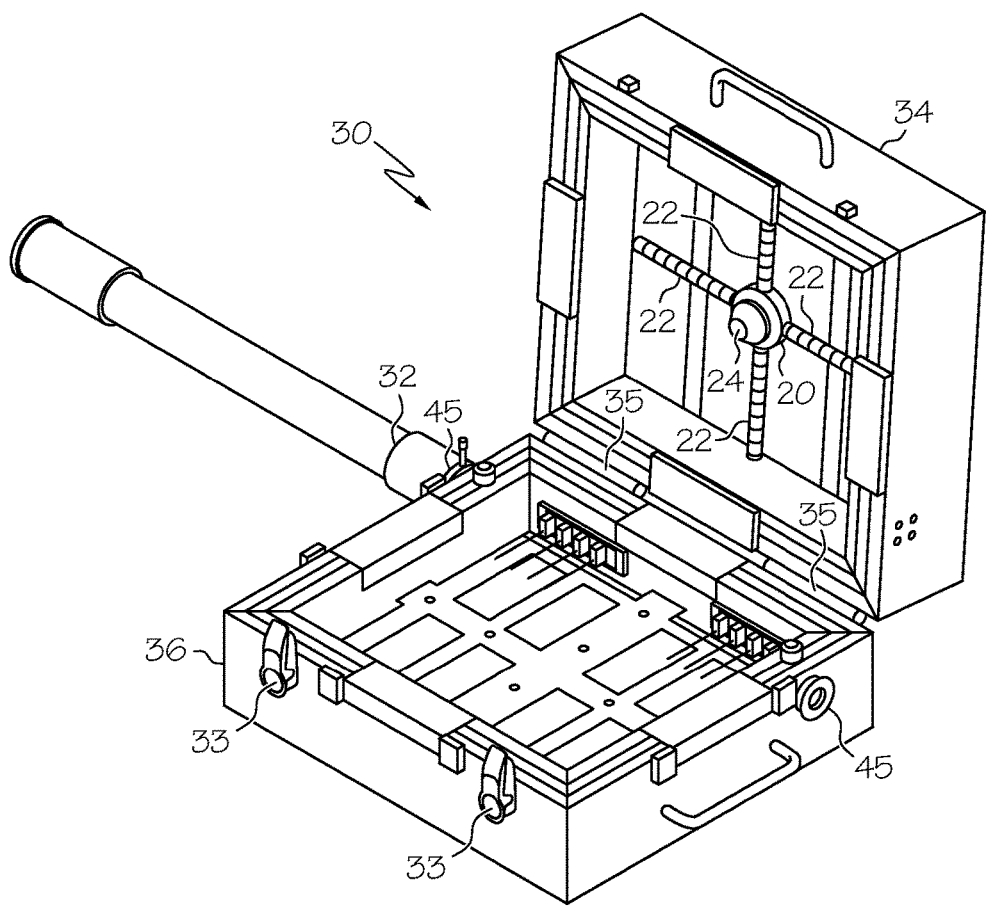
Figure 6E:
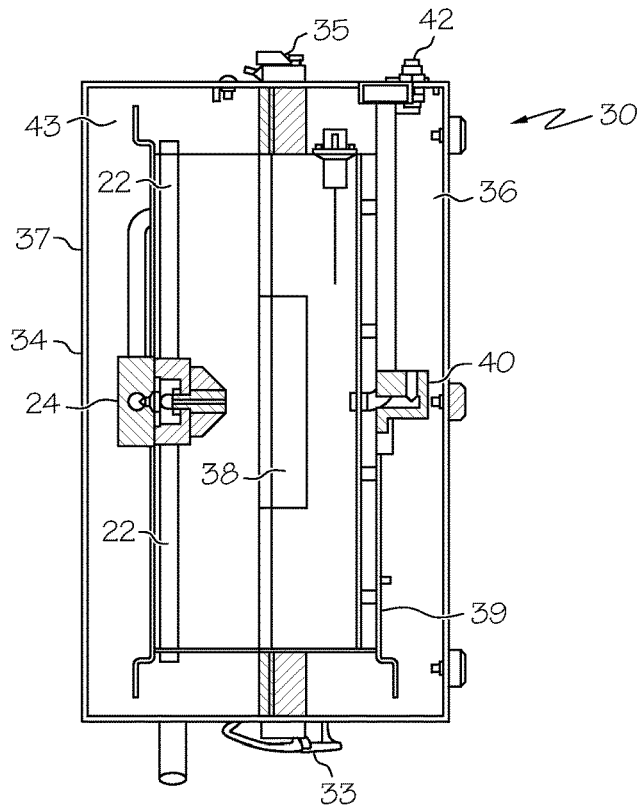
FIG. 6E is a schematic cross-sectional view of the clamshell chamber in accordance with an embodiment of the present invention.

FIGS. 6A-6E are schematic views of a clamshell chamber 30 of FIGS. 5A and 5B in accordance with an embodiment of the present invention. Specifically, FIG. 6A is a schematic top view of the clamshell chamber 30. FIG. 6B is a schematic rear view of the clamshell chamber 30. FIG. 6C is a schematic front view of clamshell chamber 30. FIG. 6D is a schematic view of the clamshell chamber 30 in an open position. FIG. 6E is a schematic cross-sectional view of the clamshell chamber 30 along section E-E of FIG. 6A in accordance with an embodiment of the present invention.

The clamshell chamber 30 includes a top portion 34 connected to a bottom portion 36 by a hinges 35. When the clamshell chamber 30 is closed, the top and bottom portions 34 and 36 are latched together by latches 33. The clamshell 30 includes four cable feed-through openings 41 for connecting cables to the interior of the clamshell chamber 30 on each side of the clamshell chamber 30.

The thermal insulation design used for the clamshell chamber 30 and as shown in FIG. 6E allows temperature changes to occur much faster than with existing approaches. The clamshell chamber 30 uses thermal insulation 43, i.e., foam, between the outer shell 37 of the clamshell chamber 30 and the inner liner 39 of the clamshell chamber 30. The inner liner 39 protects the insulation 43 from damage that might result from frequent use. The inner liner 39 is thermally decoupled from the outer shell 37 to minimize thermal losses and optimize thermal performance, i.e., temperature response and temperature uniformity. In one embodiment, the inner liner 39 is made of very thin stainless steel to minimize thermal load, but could be other suitable materials.

Figure 7A:
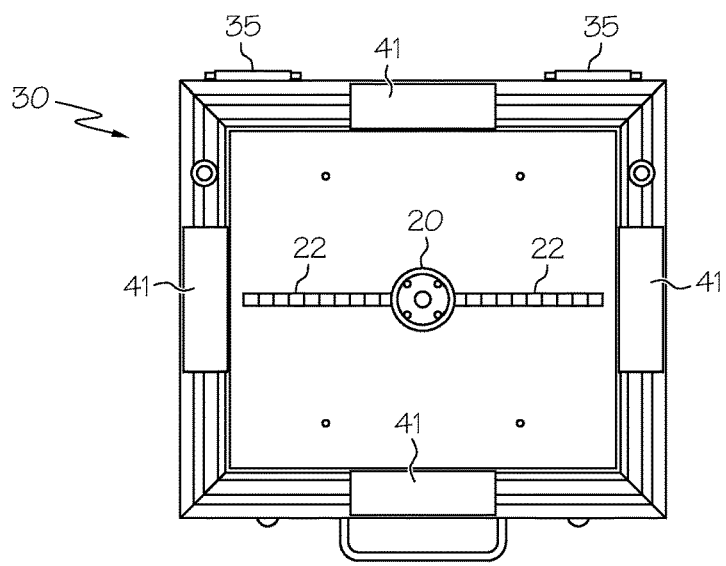
FIGS. 7A-C are schematic views of the clamshell chamber of FIGS. 5A and 5B with a universal manifold adapter in accordance with an embodiment of the invention.
Figure 7B:
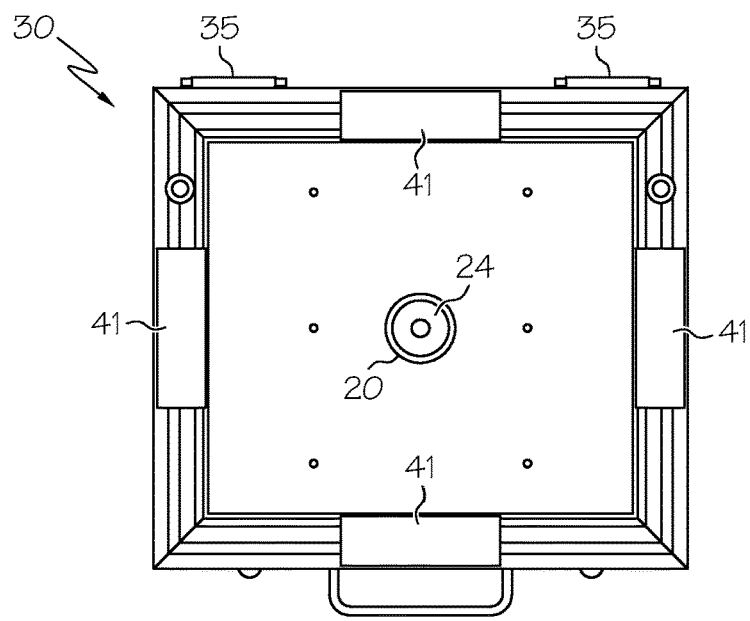
Figure 7C:
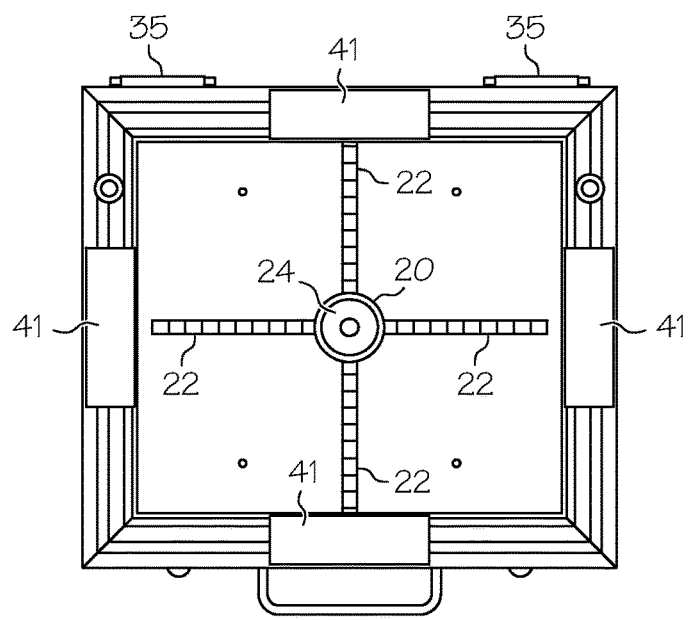

FIGS. 7A-7C are schematic views of the clamshell chamber 30 of FIGS. 5A and 5B with a universal manifold adapter 20 in accordance with an embodiment of the invention. The clamshell chamber 30 is provided with the universal manifold adapter 20 to improve temperature response which reduces time for completion of a test and, therefore, reduces test cost. The universal manifold adapter 20 allows interchangeable manifolds to be used to optimize temperature testing. To optimize thermal performance it is desirable that the temperature-controlled air being supplied by the source 10 be directed to the device being tested. Conventional thermal enclosures (chambers) simply circulate the air with no method for directing the air to the device being tested. With the universal manifold adapter 20 in the clamshell chamber 30, a manifold can be added to direct the temperature-controlled air directly to the device being tested.

The universal manifold adapter 20 allows the air distribution manifold to be changed to a different configuration if necessary to accommodate changes in test requirements within the same clamshell chamber. The universal manifold adapter 20 has several attachment points (holes) that allow attachment of interchangeable manifolds. The manifold can be a single horizontal tube 22 with multiple small holes for air discharge. The manifold can be two or more horizontal tubes 22. FIG. 7A is a schematic diagram of the clamshell chamber 30 with two horizontal tubes 22 with multiple small holes for air discharge attached to the universal manifold adapter 20. The manifold can be a piece of flexible tube to better direct air on the device being tested. The manifold can be a shower-head type to provide uniform distribution of temperature-controlled air, or any other manifold for distribution of temperature-controlled air. FIG. 7B is a schematic diagram of the clamshell chamber 30 with a shower-head type manifold 24 attached to the universal manifold adaptor 20. FIG. 7C is a schematic diagram of the clamshell chamber 30 with a shower-head type manifold 24 and four horizontal tubes 22 with multiple small holes for air discharge attached to the universal manifold adaptor 20.

The clamshell chamber 30 also incorporates a unique air exhausting system to optimize temperature uniformity within the test area. The clamshell chamber 30 includes a mounting platform 38, as shown in FIG. 6E on which the user places the device being thermally tested. The device being tested could be a printed circuit board, mechanical or electronic module or any other device requiring thermal test. The mounting platform 38 is located above an exhaust port 40, which is centrally located in the bottom of the clamshell chamber 30, so that all of the temperature-controlled air entering the clamshell chamber 30 through the air-in port 45 flows over the device being tested before it exits the clamshell chamber 30. This arrangement optimizes temperature uniformity within the clamshell chamber 30 as well as temperature response, i.e., changing set point temperatures is faster. The exhaust is internally routed to the rear of the clamshell chamber to a rear exhaust 42, as shown in FIGS. 6B and 6E.

Figure 8A:
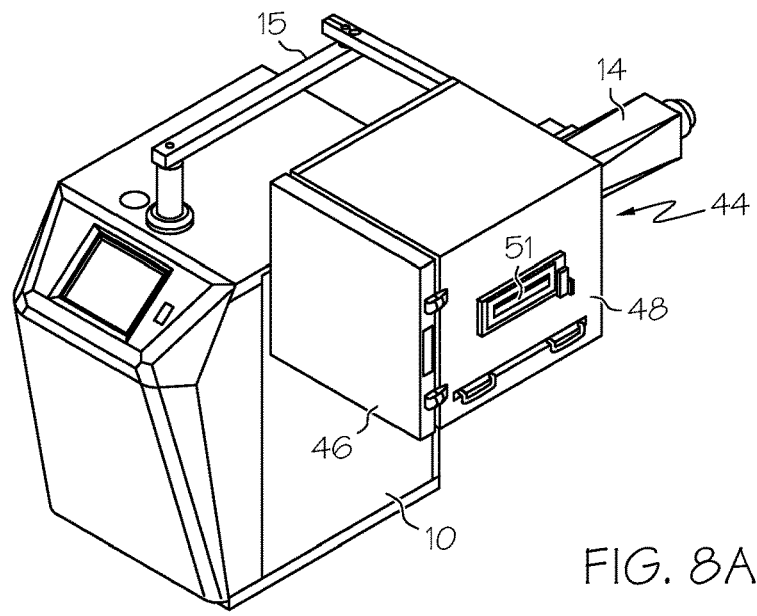
FIGS. 8A and 8B are schematic perspective view of a frontloader chamber connected to a temperature-controlled air source in accordance with an embodiment of the invention.
Figure 8B:
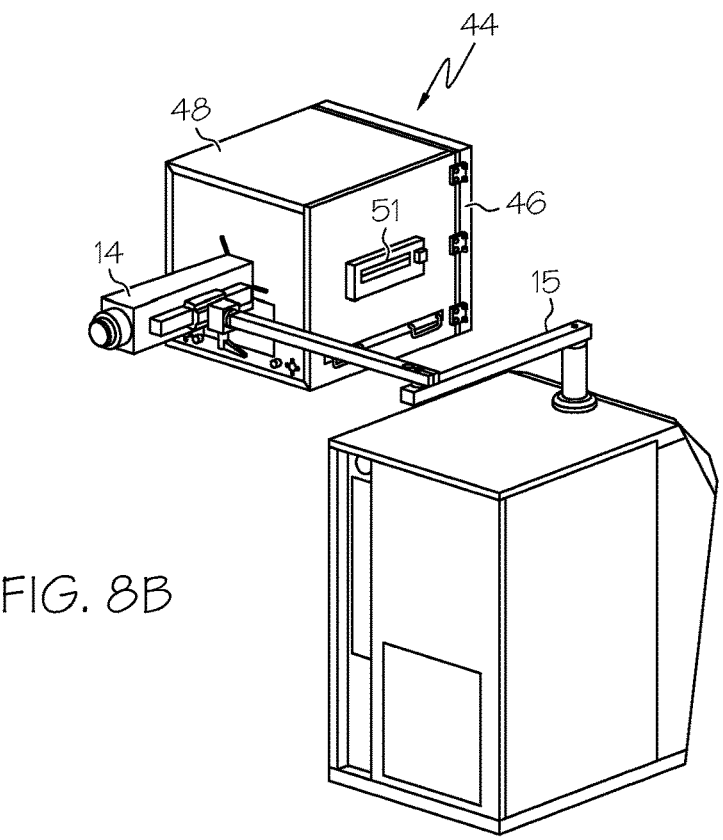
Figure 9A:
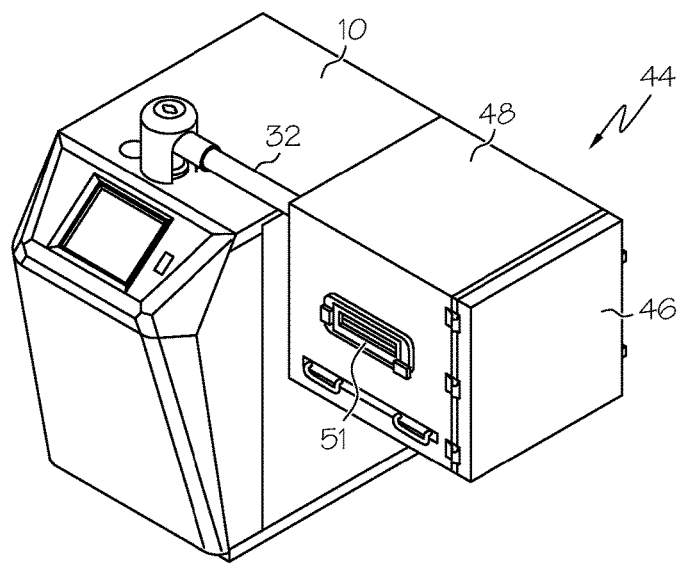
FIGS. 9A and 9B are schematic perspective views of the frontloader chamber of FIGS. 8A and 8B connected to a temperature-controlled air source in accordance with an embodiment of the invention.
Figure 9B:
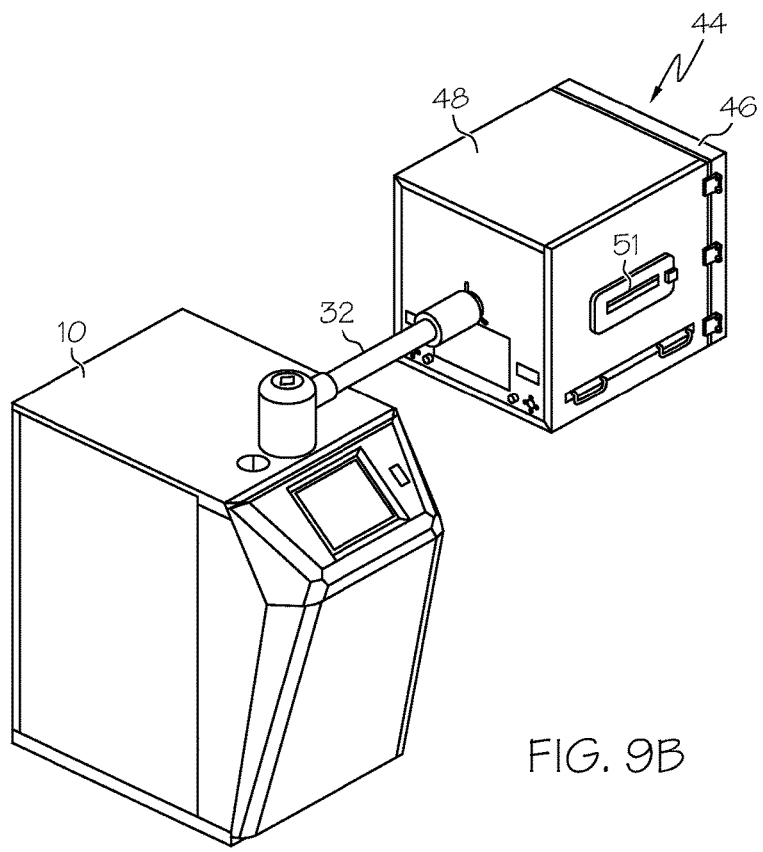
Figure 10A:
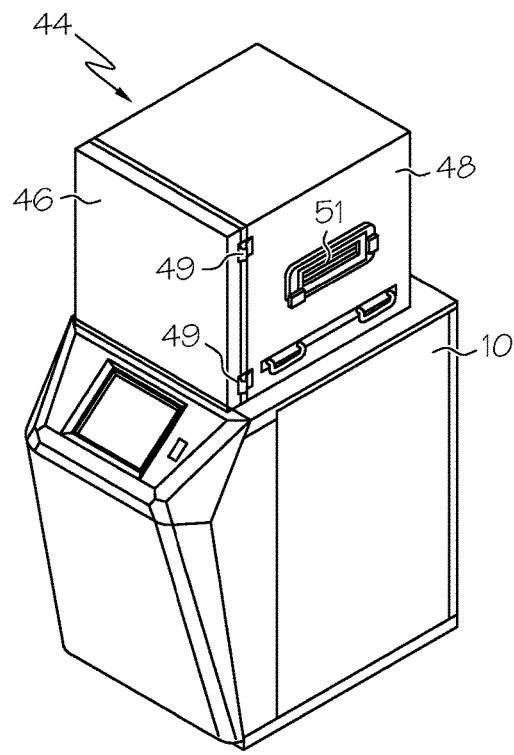
FIGS. 10A and 10B are schematic perspective view of the frontloader chamber of FIGS. 8A and 8B connected to a temperature-controlled air source in accordance with an embodiment of the invention.
Figure 10B:
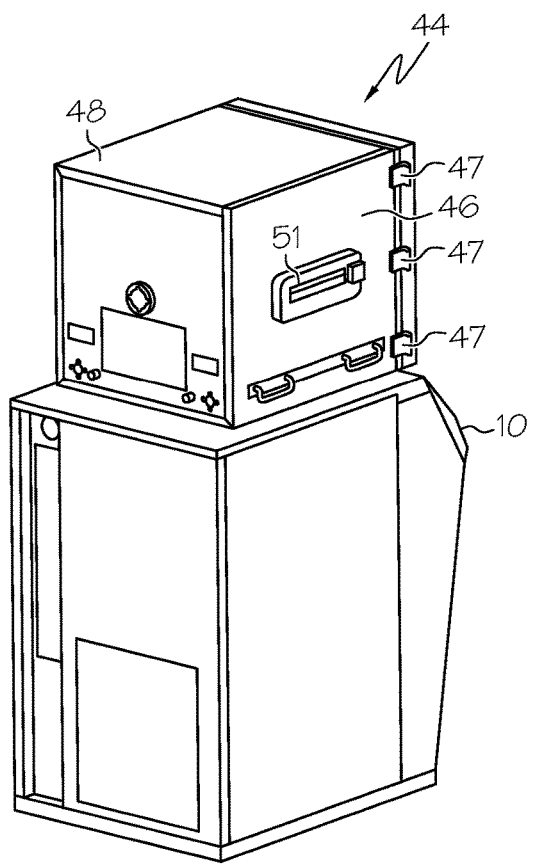

In FIGS. 8A, 8B, 9A, 9B, 10A and 10B, a source 10 is used as the temperature-controlled air source for controlling the temperature within a frontloader chamber 44, in accordance with another embodiment of the invention. FIGS. 8A and 8B are schematic perspective views of the frontloader chamber 44 connected to a source 10, in accordance with the invention. In FIGS. 8A and 8B, the head 14 of the source 10 attaches to the rear of the frontloader chamber 44 either directly or via a flex extender 32 which transfers the temperature-controlled air from the source head 14 to the frontloader chamber 44. In FIGS. 8A and 8B, the head 14 is attached to the source 10 by a pivoting arm 15. FIGS. 9A and 9B are schematic perspective views of the frontloader chamber 44 connected to a source 10, in accordance with another embodiment of the invention. In FIGS. 9A and 9B, the output of the source 10 is attached to the rear of the frontloaded chamber 44 via a flex extender 32 which transfers the temperature-controlled air from the source 10 to the frontloader chamber 44. FIGS. 10A and 10B are schematic perspective views of the frontloader chamber 44 connected to a source 10, in accordance with another embodiment of the invention. In FIGS. 10A and 10B, the frontloader chamber 44 is directly docked to the top of the source 10.

Referring to FIGS. 8A, 8B, 9A, 9B, 10A and 10B, the frontloader chamber 44 includes a front portion 46 connected to a rear portion 48 by a hinge 47. When the frontloader chamber 44 is in the closed position, latches 49 latch the front and rear portions 46 and 48 together. The frontloader chamber 44 has cable feed-through 51 for connecting cables to the interior of the frontloader chamber 44.

Figure 11:
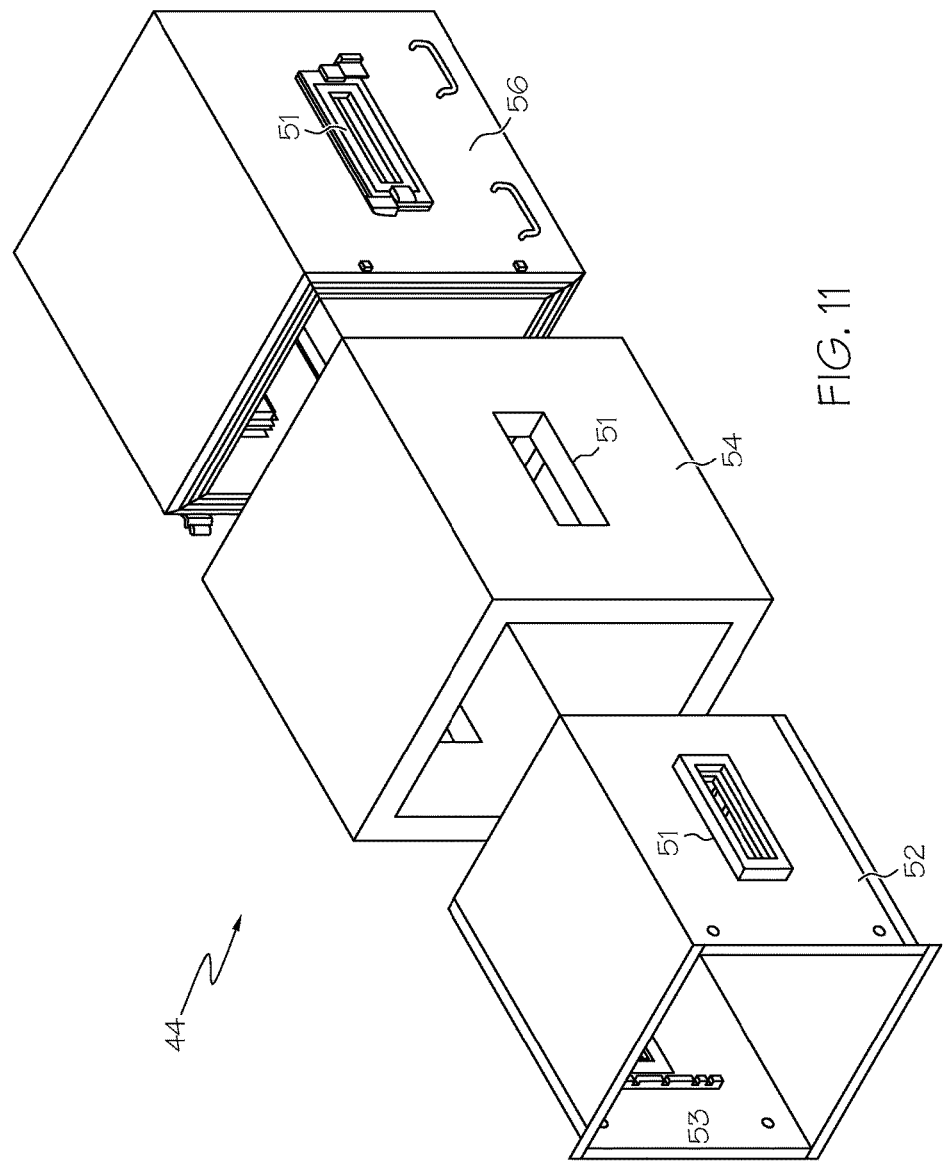
FIG. 11 is an exploded perspective view of the frontloader chamber of FIGS. 8A and 8B in accordance with an embodiment of the invention.

FIG. 11 is an exploded perspective view of the frontloader chamber 44 of FIGS. 8A and 8B in accordance with an embodiment of the invention. The thermal insulation design used for the frontloader chamber 44, as shown in FIG. 11 allows temperature changes to occur much faster than with existing approaches. The frontloader chamber 44 uses thermal insulation 54 between the outer shell 56 of the frontloader chamber 44 and the inner liner 52 of the frontloader chamber 44. The inner liner 52 protects the insulation 54 from damage that might result from frequent use. However, the inner liner 52 is thermally decoupled from the outer shell 56 to minimize thermal losses and optimize thermal performance, i.e., temperature response and temperature uniformity. In one embodiment, the inner liner 52 is made of very thin stainless steel to minimize thermal load, but could be other suitable materials.

Figure 12A:
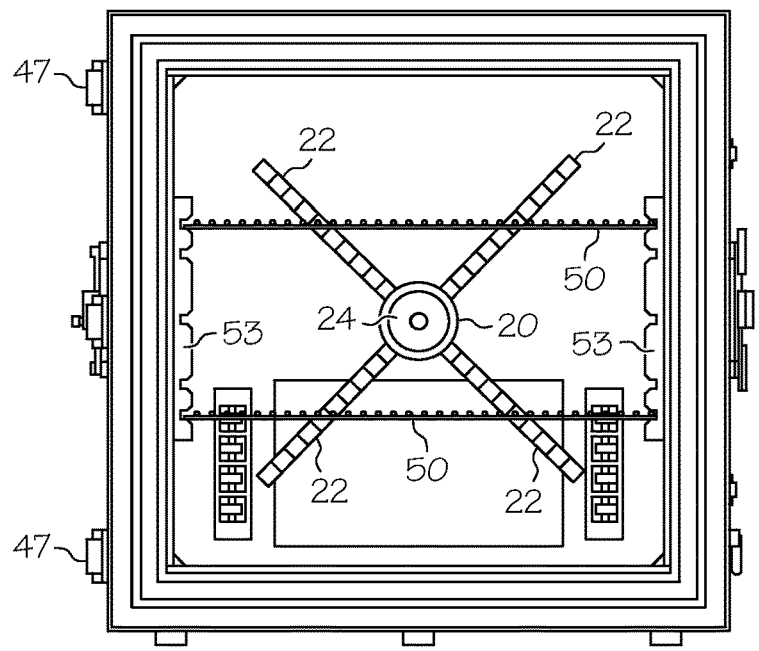
FIGS. 12A and 12B are schematic views of the front-loader chamber of FIGS. 8A and 8B with a universal manifold adapter in accordance with an embodiment of the invention.
Figure 12B:
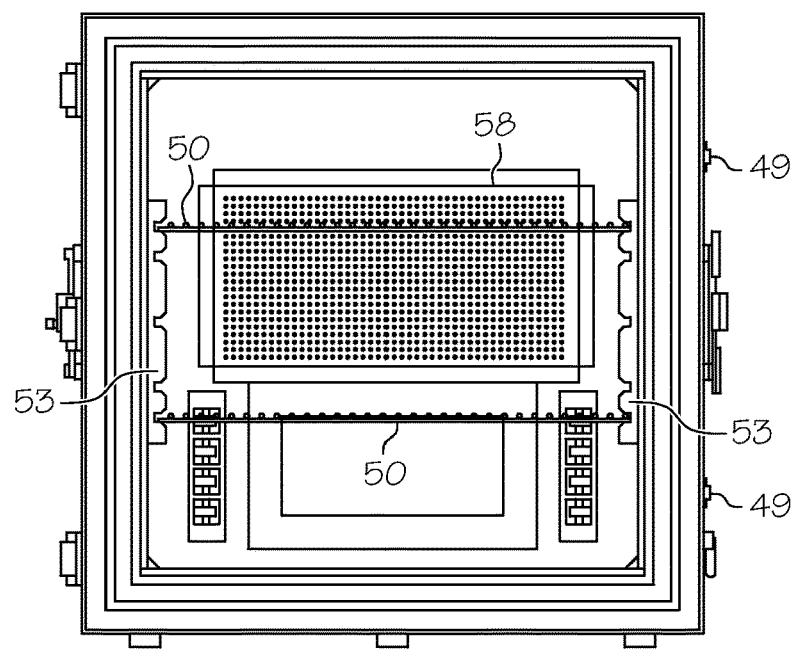

FIGS. 12A and 12B are schematic views of the frontloader chamber 44 with a universal manifold adapter 20 in accordance with an embodiment of the invention. In FIGS. 12A and 12B, the frontloader chamber 44 is provided with the universal manifold adapter 20 designed to improve temperature response which reduces time for completion of a test and, therefore, reduces test cost. The universal manifold adapter 20 allows interchangeable manifolds to be used to optimize temperature testing. To optimize thermal performance it is desirable that the temperature-controlled air being supplied by the source 10 be directed to the device being tested. Conventional thermal enclosures (chambers) simply circulate the air with no method for directing the air to the device being tested. With the universal manifold adapter 20 in the frontloader chamber 44, a manifold can be added to direct the temperature-controlled air directly to the device being tested.

The universal manifold adapter 20 allows the air distribution manifold to be changed to a different configuration if necessary to accommodate changes in test requirements within the same frontloader chamber 44. The universal manifold adapter 20 has several attachment points (holes) that allow attachment of interchangeable manifolds. The manifold can be a single tube 22 with multiple small holes for air discharge. The manifold can be two or more tubes 22 with multiple small holes for air discharge. The manifold can be a piece of flexible tube to better direct air on the device being tested. The manifold can be a shower-head type manifold to provide uniform distribution of temperature-controlled air. FIG. 12A, is a schematic diagram of the frontloader chamber 44 with a shower-head type manifold 24 and four horizontal tubes 22 with multiple small holes for air discharge attached to the universal manifold adapter 20. The manifold can be a baffle system 58, as shown in FIG. 12B, in which a plate uniformly distributes temperature-controlled air over a large area or any other manifold for distribution of temperature-controlled air.

Figure 13A:
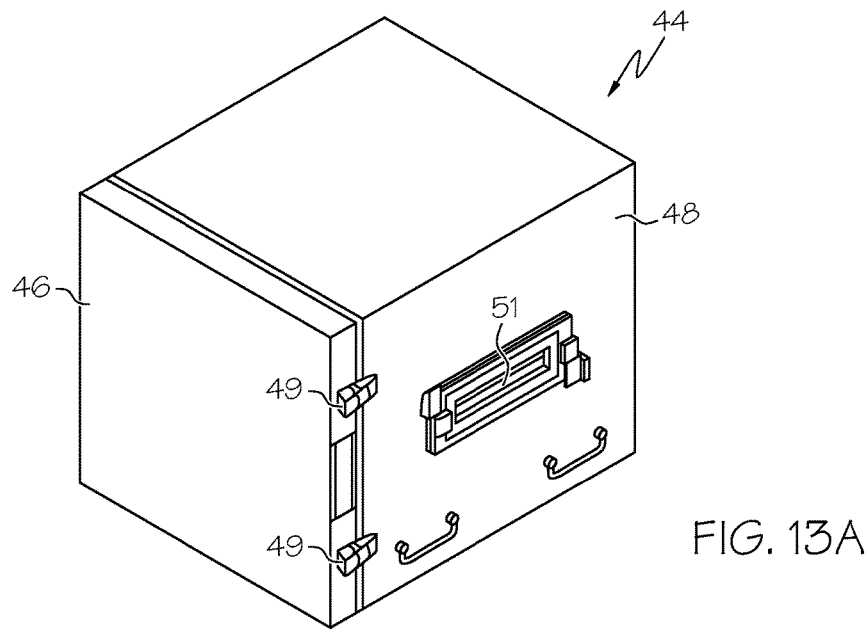
FIGS. 13A-13E are schematic views of the frontloader chamber of FIGS. 8A and 8B in accordance with an embodiment of the invention.
Figure 13B:
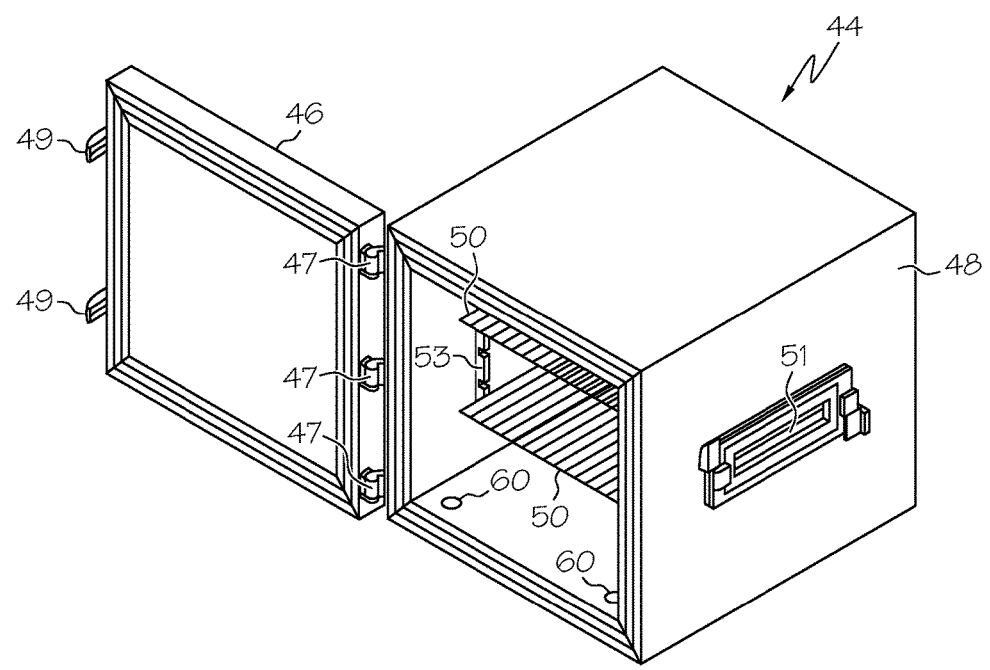
Figure 13C:
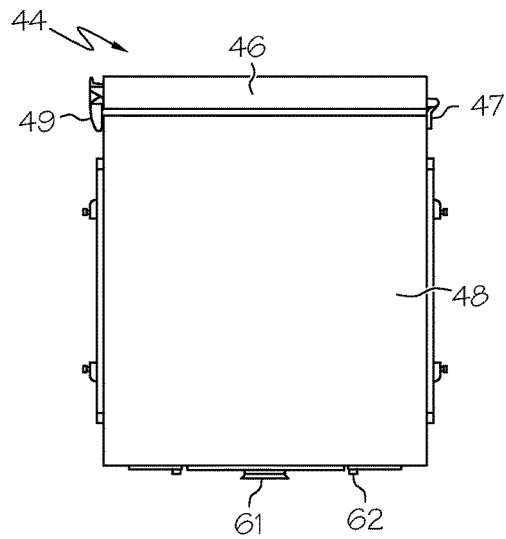
Figure 13D:
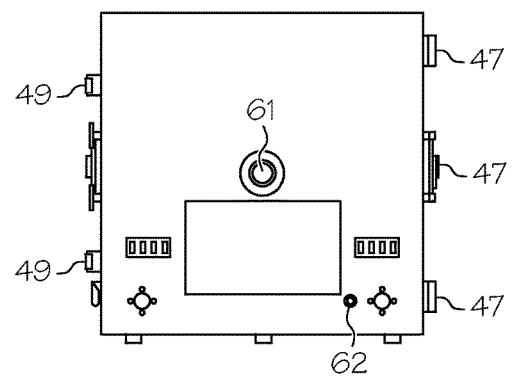
Figure 13E:
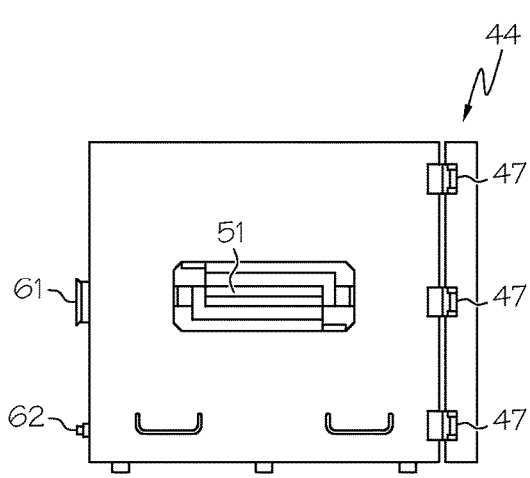

The frontloader chamber 44 also incorporates a unique air exhausting system to optimize temperature uniformity within the test area. FIGS. 13A-13E are schematic views of the frontloader chamber 44 in accordance with an embodiment of the invention. Specifically, FIG. 13A is a schematic view of the frontloader chamber 44 in a closed position. FIG. 13B is a schematic view of the frontloader chamber 44 in an open position. FIG. 13C is a schematic top view of the frontloader chamber 44. FIG. 13D is a schematic rear view of the frontloader chamber 44. FIG. 13E is a schematic side view of the frontloader chamber 44. The frontloader chamber 44 can include various types of shelving on which the user places the device being thermally tested. The device being tested could be a printed circuit board, mechanical or electronic module or any other device requiring thermal test. In the preferred embodiment, as shown in FIGS. 12A, 12B and 13B, the shelving 50 is generally located in horizontal planes allowing the temperature-controlled air to flow over the device(s) being tested before it exits the frontloader chamber 44. The shelving 50 is attached to the frontloader chamber 44 by a mounting device 53. The mounting device 53 has multiple notches, such that the shelves 50 can be inserted into the mounting device at multiple locations or include multiple shelves 50. As shown in FIG. 13D, air enters the rear of the frontloader chamber 44 through the air-in port 61 and flows forward to four or more exhaust ports areas 60 located so as to optimize thermal response and temperature uniformity within the frontloader chamber 44. The exhaust ports areas 60 are shown, in FIG. 13B, in the four forward corners but could be at other locations to optimize thermal performance. The exhaust is internally routed to the rear of the frontloader chamber 44 through rear exhaust port 62.

Figure 14A:
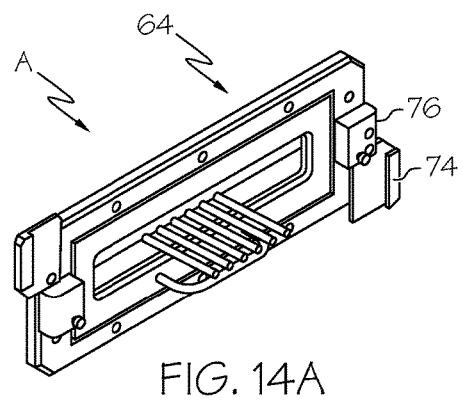
FIGS. 14A-14H are schematic views of a self-closing cable feed-through module in accordance with an embodiment of the invention.
Figure 14B:
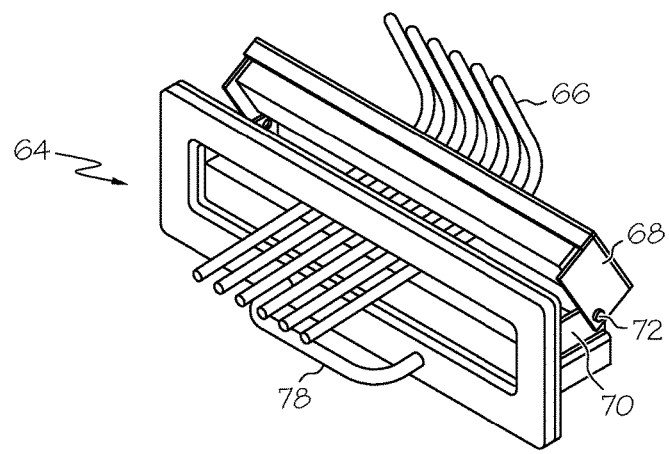
Figure 14C:
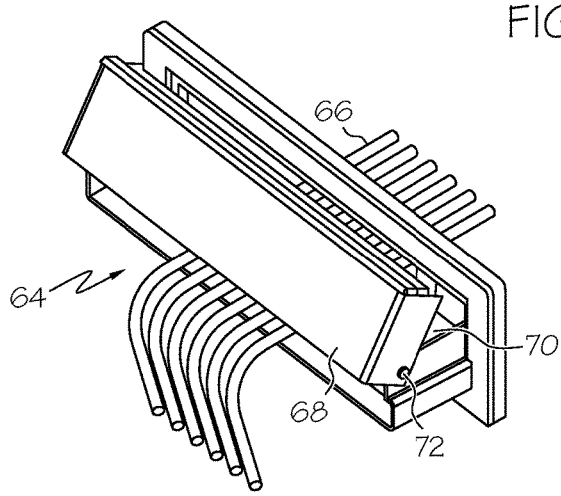
Figure 14D:
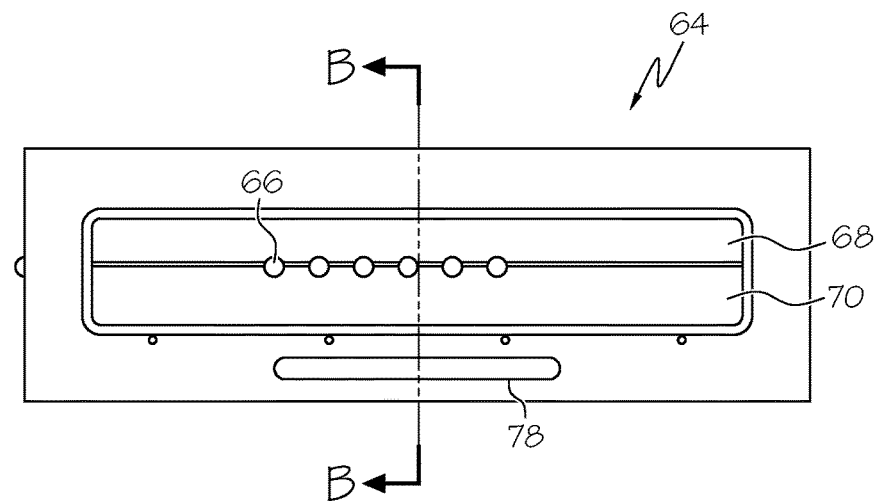
Figure 14E:
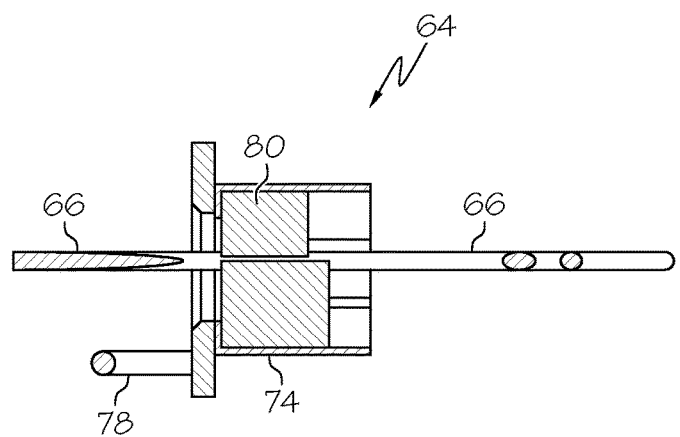
Figure 14F:
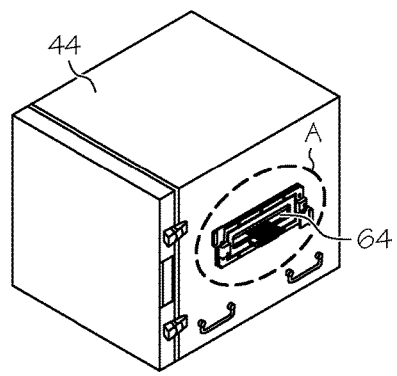
Figure 14G:
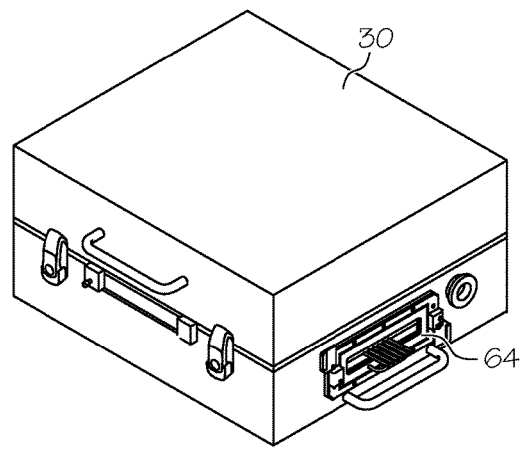
Figure 14H:
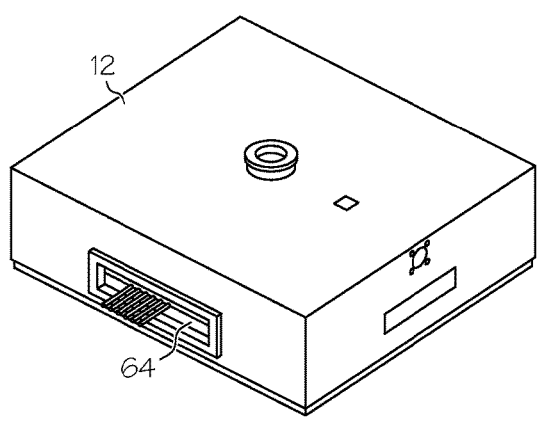

FIGS. 14A-14H are schematic views of a self-closing cable feed-through module 64 in accordance with an embodiment of the invention. The self-closing cable feed-through module 64 of the invention can be used in connection with the frontloader chamber 44, as shown in FIG. 14F, in connection with the clamshell chamber 30, as shown in FIG. 14G, and in connection with the hood chamber 12, as shown in FIG. 14H, or in connection with any other standard temperature chamber or other yet undefined chamber configurations.

FIG. 14A is a detailed schematic view of section A of FIG. 14F, illustrating the cable feed-through module 64 used with the frontloader chamber 44, as an example. The self-closing cable feed-through module 64 provides a convenient way for passing cables 66 from the exterior of a chamber to the interior of a chamber. The cables 66 referred to can be for any purpose to support the requirements of the device being temperature tested in the chamber. The cables 66 connect the device being tested inside the chamber to a test system that is used to send and/or receive data from the device being tested in the chamber. The self-closing cable feed-through module 64 is removable from the chamber for installation of the cables 66. The cables 66 are routed through a first half 68 and a second half 70 of the self-closing cable feed-through module 64. The self-closing cable feed-through module 64 is then installed into the chamber wall and, when installed, the first half 68 and the second half 70 close tightly and form a leak-tight seal around the cables, as shown in FIGS. 14A, 14D and 14E.

The self-closing cable feed-through module 64 is secured in place with clamps 74 as shown in FIGS. 14A and 14E or by any other suitable means. A dry air source 76 provides dry air to self-closing cable feed-through module 64 to ensure that there is no moisture/frost formation during cold temperature operation. The self-closing cable feed-through module 64 is connected to an outer surface of a chamber. When the self-closing cable feed-through module 64 is in an open position, as shown in FIGS. 14B and 14C, the first half 68 and the second half are separated by rotating the second half 70 relative to the first half about joint 72. When the self-closing cable feed-through module 64 is in the open position, the cables 66 are fed through the first and second halves 68 and 70 into the chamber. When the self-closing cable feed-through module 64 is in a closed position, first and second portions are closed and form a leak tight seal around the cables 66, as shown in FIGS. 14A, 14D and 14E. As shown in FIGS. 14A, 14B and 14D-14H, self-closing cable feed-through module 64 includes a pull handle 78. FIG. 14E is a cross-sectional view along section B-B of FIG. 14D. As shown in FIG. 14D, the self-closing cable feed-through module 64 includes insulation 80.

While the present invention has been particularly shown and described with reference to exemplary embodiments thereof, it will be understood by those of ordinary skill in the art that various changes in form and details may be made therein without departing from the spirit and scope of the present invention as defined by the following claims.

We claim:

1. A temperature chamber, comprising:
   a chamber in which a device can be located, the chamber being connectable to a temperature-controlled source for providing a temperature-controlled fluid to the chamber to control temperature of the chamber; and
   a self-closing cable feed-through module connected to an outer surface of the chamber, the module comprising:
      a first portion;
      a second portion; and
      a joint at which the first and second portions are rotatable with respect to each other between a first open configuration of the self-closing cable feed-through module and a second closed configuration of the self-closing cable feed-through module, rotation of the first and second portions creating a first opening at the joint between the first and second portions, wherein, in the first open configuration of the self-closing cable feed-through module, cables are feedable through the first opening at the joint between the first and second portions into a second opening in the chamber, and, in the second closed configuration of the self-closing cable feed-through module, the first and second portions form a seal around the cables.

2. The temperature chamber of claim 1, further comprising an exhaust system for exhausting the fluid from the chamber.

3. The temperature chamber of claim 2, wherein the exhaust system comprises a plurality of exhaust ports connected internal to the chamber and a single outlet port for allowing the fluid to exit the chamber.

4. The temperature chamber of claim 2, wherein the exhaust system comprises a plurality of exhaust ports connected internal to the chamber and multiple outlet ports for allowing the fluid to exit the chamber.

5. The temperature chamber of claim 2, wherein the exhaust system comprises an exhaust port centrally located in the bottom of the chamber and an outlet port for allowing the fluid to exit the rear of the chamber.

6. The temperature chamber of claim 2, wherein a location of an exhaust is selectable by a user.

7. The temperature chamber of claim 1, wherein the fluid is air.

8. The temperature chamber of claim 1, further comprising thermal insulation material.

9. The temperature chamber of claim 8, wherein the chamber has a hood configuration.

10. The temperature chamber of claim 9, wherein the thermal insulation material is formed on side surfaces of the chamber, wherein a thin layer of silicone is bonded to the surface of the thermal insulation material.

11. The temperature chamber of claim 8, wherein the thermal insulation material is positioned between an outer shell of the chamber and an inner liner of the chamber.

12. The temperature chamber of claim 11, wherein the inner liner of the chamber is thermally decoupled from the outer shell.

13. The temperature chamber of claim 12, wherein the chamber has a clamshell configuration in which a top portion of the chamber is connected to a bottom portion of the chamber such that the top portion is opened in order to load the device into the chamber.

14. The temperature chamber of claim 12, wherein the chamber has a front-loader configuration in which a front portion of the chamber is connected to a rear portion of the chamber such that the front portion is opened in order to load the device into the chamber.

15. The temperature chamber of claim 1, further comprising a universal manifold adaptor for directing the temperature-controlled fluid directly to the device.

16. The temperature chamber of claim 15, wherein interchangeable manifolds are attachable to the universal manifold adaptor to direct the fluid to the device.

17. The temperature chamber of claim 16, wherein a manifold comprises a single horizontal tube with multiple small holes for discharge of the fluid.

18. The temperature chamber of claim 16, wherein a manifold comprises a plurality of horizontal tubes with multiple small holes for discharge of the fluid.

19. The temperature chamber of claim 16, wherein a manifold has a shower-head configuration to provide uniform distribution of the fluid.

20. The temperature chamber of claim 16, wherein a manifold comprises a baffle system.

21. A temperature control system for controlling temperature of a device, comprising:
   a chamber in which the device can be located;
   a temperature-controlled source connected to the chamber for providing a temperature-controlled fluid to the chamber to control temperature in the chamber; and
   a self-closing cable feed-through module connected to an outer surface of the chamber, the module comprising:
      a first portion;
      a second portion; and
      a joint at which the first and second portions are rotatable with respect to each other between a first open configuration of the self-closing cable feed-through module and a second closed configuration of the self-closing cable feed-through module, rotation of the first and second portions creating a first opening at the joint between the first and second portions, wherein, in the first open configuration of the self-closing cable feed-through module, cables are feedable through the first opening at the joint between the first and second portions into a second opening in the chamber, and, in the second closed configuration of the self-closing cable feed-through module, the first and second portions form a seal around the cables.

22. The temperature control system of claim 21, further comprising a universal manifold adaptor for directing the temperature-controlled fluid directly to the device.

23. The temperature control system of claim 22, wherein interchangeable manifolds are attachable to the universal manifold to direct the fluid to the device.

24. The temperature control system of claim 23, wherein a manifold comprises a single horizontal tube with multiple small holes for discharge of the fluid.

25. The temperature control system of claim 23, wherein a manifold comprises a plurality of horizontal tubes with multiple small holes for discharge of the fluid.

26. The temperature control system of claim 23, wherein a manifold has a shower-head configuration to provide uniform distribution of the fluid.

27. The temperature control system of claim 23, wherein a manifold comprises a baffle system.

28. The temperature control system of claim 21, further comprising an exhaust system for exhausting the fluid from the chamber.

29. The temperature control system of claim 28, wherein the exhaust system comprises a plurality of exhaust ports connected internal to the chamber and a single outlet port for allowing the fluid to exit the chamber.

30. The temperature control system of claim 28, wherein the exhaust system comprises a plurality of exhaust ports connected internal to the chamber and multiple outlet ports for allowing the fluid to exit the chamber.

31. The temperature control system of claim 28, wherein the exhaust system comprises an exhaust port centrally located in the bottom of the chamber and an outlet port for allowing the fluid to exit the rear of the chamber.

32. The temperature control system of claim 28, wherein a location of an exhaust is selectable by a user.

33. The temperature control system of claim 21, further comprising thermal insulation material formed on side surfaces of the chamber.

34. The temperature control system of claim 33, wherein the chamber has a hood configuration.

35. The temperature control system of claim 34, wherein a thin layer of silicone is bonded to the surface of the thermal insulation material.

36. The temperature control system of claim 33, wherein the chamber has a clamshell configuration in which a top portion of the chamber is connected to a bottom portion of the chamber such that the top portion is opened in order to load the device being tested into the chamber.

37. The temperature control system of claim 36, wherein the thermal insulation material is positioned between an outer shell of the chamber and an inner liner of the chamber.

38. The temperature control system of claim 37, wherein the inner liner of the chamber is thermally decoupled from the outer shell.

39. The temperature control system of claim 33, wherein the chamber has a front-loader configuration in which a front portion of the chamber is connected to a rear portion of the chamber such that the front portion is opened in order to load the device into the chamber.

40. The temperature control system of claim 39, wherein the thermal insulation material is positioned between an outer shell of the front-loader and an inner liner of the chamber.

41. The temperature control system of claim 40, wherein the inner liner of the chamber is thermally decoupled from the outer shell.

42. The temperature control system of claim 21, wherein the fluid is air.

43. The temperature control system of claim 21, wherein the self-closing cable feed-through module is removable from the chamber.

44. The temperature control system of claim 21, wherein the self-closing cable feed-through module is installed into a wall of the chamber, and clamps secure the self-closing cable feed-through module to the chamber.

45. The temperature control system of claim 21, further comprising a dry air source for providing dry air to the self-closing cable feed-through module.

46. The temperature control system of claim 21, wherein the self-closing cable feed-through module comprises a joint for rotating the second portion relative to the first portion.

47. The temperature control system of claim 21, wherein the self-closing cable feed-through module further comprises insulation.

48. A self-closing cable feed-through module, comprising:
a first portion;
a second portion; and
a joint at which the first and second portions are rotatable with respect to each other between a first open configuration of the self-closing cable feed-through module and a second closed configuration of the self-closing cable feed-through module, rotation of the first and second portions creating an opening at the joint between the first and second portions, wherein, in the first open configuration of the self-closing cable feed-through module, cables are feedable through the opening at the joint between the first and second portions, and, in the second closed configuration of the self-closing cable feed-through module, the first and second portions form a seal around the cables.

49. The self-closing cable feed-through module of claim 48, further comprising a dry air source for providing dry air to the self-closing cable feed-through module.

50. The self-closing cable feed-through module of claim 48, wherein the self-closing cable feed-through module further comprises insulation.

51. An environmental control system, comprising:
a chamber in which a device can be located; and
a self-closing cable feed-through module connected to an outer surface of the chamber, the self-closing cable feed-through module comprising:
a first portion;
a second portion; and
a joint at which the first and second portions are rotatable with respect to each other between a first open configuration of the self-closing cable feed-through module and a second closed configuration of the self-closing cable feed-through module, rotation of the first and second portions creating a first opening at the joint between the first and second portions, wherein, in the first open configuration of the self-closing cable feed-through module, cables are feedable through the first opening at the joint between the first and second portions into a second opening in the chamber, and, in the second closed configuration of the self-closing cable feed-through module, the first and second portions form a seal around the cables.

52. The environmental control system of claim 51, wherein the self-closing cable feed-through module is removable from the chamber.

53. The environmental control system of claim 51, further comprising a dry air source for providing dry air to the self-closing cable feed-through module.

54. The environmental control system of claim 51, wherein the self-closing cable feed-through module further comprises insulation.

55. The environmental control system of claim 51, wherein the environmental control system is a temperature control system for controlling a temperature of the device.

* * * * *